Patented Nov. 7, 1950

2,528,940

UNITED STATES PATENT OFFICE 2,528,940

PYRROLIDYLETHYL INDOLE COMPOUNDS

John B. Wright, Kalamazoo, Mich., assignor to The Upjohn Company, Kalamazoo, Mich., a corporation of Michigan No Drawing. Application January 21, 1949, Serial No. 72,060

6 Claims. (Cl. 260—313)

This invention relates to antihistaminics and is more particularly concerned with 1-[beta-(1-pyrrolidyl)-ethyl]-indole compounds having the formula:

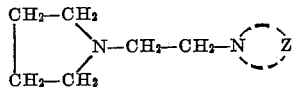

wherein Z is the remainder of a radical selected from the group consisting of indole, 2,3-dihydroindole, 2-phenylindole, and 2-phenyl-2,3-dihydroindole, and acid addition and quaternary ammonium salts thereof.

It is an object of the present invention to provide a novel group of compounds possessing utility as therapeutics for the treatment of allergic manifestations. A further object of the present invention is to provide therapeutically-active antihistamine compounds which are easily synthesized from readily available materials. Another object of the present invention is to provide novel antihistaminics containing the pyrrolidyl nucleus. The compounds are additionally useful as intermediates in the preparation of more complex organic molecules. Other objects will become apparent hereinafter.

The foregoing and additional objects are accomplished by the provision of compounds of the formula:

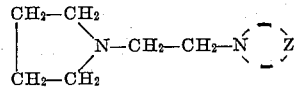

wherein Z is the remainder of a radical selected from the group consisting of indole, 2,3-dihydroindole, 2-phenylindole, and 2-phenyl-2,3-dihydroindole, and acid addition and quaternary ammonium salts of the foregoing. These novel compounds have been found to counteract histamine-induced spasm of smooth muscle tissues, and are therefore useful in the treatment of various allergic manifestations, such as hay fever. The radicals comprising the

group of the present invention are the indole group

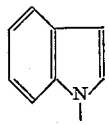

the 2,3-dihydroindole group

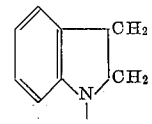

the 2-phenylindole group

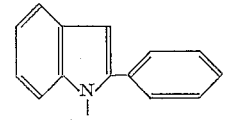

and the 2,3-dihydro-2-phenylindole group

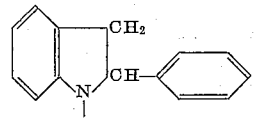

and these are connected through the nitrogen atom to the beta-carbon atom of the (1-pyrrolidyl)-ethyl radical to make up the compounds of the present invention, as illustrated by the above structural formulae.

The free bases of the present invention may be conveniently prepared by condensing the N-sodium salt of the selected indole compound, i. e., indole, 2,3-dihydroindole, 2-phenyl-indole, or 2-phenyl-2,3-dihydroindole, with beta-(1-pyrrolidyl)-ethyl chloride in an aromatic hydrocarbon solvent, e. g., toluene or xylene. The sodium salt of the indole compound may be formed according to known procedure, as by heating the selected indole compound with sodamide at about reflux temperature using toluene as a solvent, or by heating the selected indole compound with metallic sodium at a temperature of 180–200 degrees centigrade. The condensation step may be conveniently effected by heating the beta-(1-pyrrolidyl)-ethyl chloride with the selected N-sodium indole compound for several hours at reflux temperature. The products are then isolated by pouring the cooled mixture into water, extracting the aqueous suspension with an aromatic hydrocarbon solvent, washing the extract with water, removing the solvent, and thereafter isolating the product by fractional distillation under reduced pressure. Alternatively, the aromatic hydrocarbon solution may be extracted with aqueous hydrochloric acid, the acid solution made basic with potassium carbonate, extracted with ether, the ether removed, and the residue fractionally distilled under reduced pressure. When the starting indole compound is a 1,2-dihydroindole or 2-phenyl-1,2-dihydroindole, the reaction product is preferably purified by heating with acetic anhydride prior to the steps of pouring into water and extracting with acid. The unreacted 1,2-dihydroindole compound is thus acetylated, and the 1,2-dihydroindole acetate compound formed, being insoluble in acid, is readily separated from the desired product by the acid extraction step.

The salts of the present invention which are, in some cases, even more desirable than the free base as therapeutic agents, may be prepared in any convenient manner known in the art, as by mixing the free base with an acid in stoichiometric proportions, either in the presence of an organic solvent in which the salt is insoluble so that precipitation occurs upon formation thereof, or by merely admixing solutions of the acid and amine and evaporating to dryness to yield the solid salt. Representative acids which may be used are formic, acetic, citric, picric, sulfuric, hydrochloric, hydrobromic, hydriodic, phosphoric, succinic, salicyclic, and others. Acid addition salts may be formed with the nitrogen atom of the pyrrolidyl group in all of the compounds of the present invention, and quaternary ammonium acid addition products of the nitrogen atom of the indole radical may also be formed if the 2,3-dihydroindole and the 2-phenyl-2,3-dihydroindole nucleus is present. Whether the mono- or di- addition salt is produced dependent upon the relative proportions of basic amine and salt-forming agent used in preparing the salt. Compounds which may be used to form quaternary ammonium salts are alkyl halides, aralkyl halides, and alkyl esters of arylsulfonic acids, such as, for example, methyl iodide, methyl bromide, cetyl bromide, myristyl iodide, lauryl bromide, benzyl chloride, allyl bromide, ethyl (para-toluene)-sulfonic acid, et cetera, in which case the free amine and salt-forming agent are merely mixed together, heated to complete the reaction, and the salt thereafter isolated. The quaternary ammonium salts are, in some instances, also valuable as surface-tension depressants and wetting agents.

The following examples are given to illustrate the present invention but are in no way to be construed as limiting.

*Example 1.—Preparation of 1-[beta-(1-pyrrolidyl)-ethyl]-indole*

A mixture of 29.3 grams of indole and 5.76 grams of sodium was heated, with stirring, at a temperature of 180–200 degrees centigrade for two hours. The reaction mixture was then cooled to about 100 degrees centigrade, 100 milliliters of dry xylene added with stirring, the mixture heated at reflux temperature for an additional fifteen minutes, and cooled again. After cooling the suspension of the N-sodium indole thus prepared, 33.4 grams of beta-(1-pyrrolidyl)-ethyl chloride was added and the mixture heated under reflux for six hours. The reaction mixture was cooled to room temperature, filtered to remove the sodium chloride which had formed, and the xylene filtrate set aside. The sodium chloride filter cake was washed with xylene, dissolved in water, and the aqueous solution extracted with xylene. The xylene solutions were combined and extracted with three percent hydrochloric acid. The acid extract thus obtained was made alkaline with solid potassium carbonate and thereafter extracted with ether. The ether extract was dried, the ether removed, and the residue fractionally distilled. There was thus obtained 29.9 grams of 1-[beta-(1-pyrrolidyl)-ethyl]-indole, distilling at 128–129 degrees centigrade under a pressure of 0.25 millimeter of mercury.

The picrate, prepared in alcohol, formed reddish-orange flat needles, which, after two crystallizations from ethyl acetate, melted at 142–142.5 degrees centigrade.

Analysis: Calculated for $C_{20}H_{21}N_5O_7$: C, 54.17; H, 4.77; N, 15.80. Found: 54.34, 4.51, 15.62.

*Example 2.—Preparation of 1-[beta-(1-pyrrolidyl)-ethyl]-2,3-dihydroindole*

2,3-dihydroindole (8.93 grams) was added dropwise to a stirred suspension of sodamide (prepared from 1.9 grams of sodium) in toluene, and heated under reflux for an additional two and one-half hours. Thereafter the mixture was cooled, 10.0 grams of beta-(1-pyrrolidyl)-ethyl chloride added, and heating under reflux continued for an additional fifteen hours. The mixture was cooled and filtered to remove the sodium chloride which had formed and the toluene filtrate set aside. The sodium chloride was dissolved in water and the aqueous solution extracted with toluene. The toluene solutions were combined, dried, the toluene removed and the residue fractionally distilled. There was thus obtained 11.3 grams of 1-[beta-(1-pyrrolidyl)-ethyl]-2,3-dihydroindole, distilling at 102–105 degrees centigrade at a pressure of 0.15 millimeter of mercury.

Analysis: Calculated for $C_{14}H_{20}N_2$: C, 77.73; H, 9.32; N, 12.95. Found: 78.03, 9.05, 12.89.

*Example 3.—Preparation of 1-[beta-(1-pyrrolidyl)-ethyl]-2-phenylindole*

The sodium salt of 2-phenylindole was prepared by reacting sodamide (obtained from 5.06 grams of sodium) and 19.2 grams of 2-phenylindole in xylene according to the procedure of Example 2. Seventeen grams of beta-(1-pyrrolidyl)-ethyl chloride hydrochloride was then added to the sodium salt of 2-phenylindole, whereafter the mixture was stirred and heated under reflux for fifteen hours. The reaction mixture, when treated as in Example 2, yielded 19.1 grams of 1-[beta-(1-pyrrolidyl)-ethyl]-2-phenylindole, which distilled at 187–189 degrees centigrade at a pressure of 0.9 millimeter of mercury, and melted, after crystallization from methanol, at 78–78.5 degrees centigrade.

Analysis: Calculated for $C_{20}H_{22}N_2$: C, 82.71; H, 7.64; N, 9.65. Found: 83.04, 7.36, 9.71.

*Example 4.—Preparation of 1-[beta-(1-pyrrolidyl)-ethyl]-2-phenyl-2,3-dihydroindole*

The sodium salt of 2-phenyl-2,3-dihydroindole, prepared from 11.7 grams of 2-phenyl-2,3-dihydroindole and sodamide (obtained from 3.05 grams of sodium), was condensed with 10.3 grams of beta-(1-pyrrolidyl)-ethyl chloride hydrochloride according to the procedure of Example 2. After the reaction was complete, acetic anhydride was added and the mixture heated for one hour to acetylate any unreacted 2-phenyl-2,3-dihydroindole. The acetic anhydride was decomposed with water and the reaction product isolated by acid extraction and distillation as in Example 2. There was thus obtained 10.5 grams of 1-[beta-(1-pyrrolidyl)-ethyl]-2-phenyl-2,3-dihydroindole, distilling at 162–165 degrees centigrade under a pressure of 0.2 millimeter of mercury.

The monohydrochloride was prepared in conventional manner, and, after several crystallizations from a mixture of isopropanol and ethyl acetate, found to melt at 189.5–191.5 degrees centigrade.

Analysis: Calculated for $C_{20}H_{25}N_2Cl$: C, 73.04; H, 7.66; N, 8.52; N, 10.78. Found: 72.99, 7.48, 8.56, 10.88.

Various modifications may be made in the present invention without departing from the spirit or scope thereof, and it is to be understood that I limit myself only as defined in the appended claims.

I claim:

1. A compound selected from the group consisting of (1) diamines of the formula:

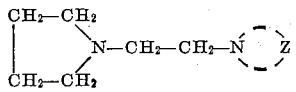

wherein Z is the remainder of a radical selected from the group consisting of indole, 2,3-dihydroindole, 2-phenylindole, and 2-phenyl-2,3-dihydroindole, and (2) acid addition and quaternary ammonium salts thereof.

2. An acid addition salt of a diamine of the formula:

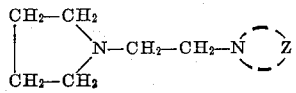

wherein Z is the remainder of a radical selected from the group consisting of indole, 2,3-dihydroindole, 2-phenylindole, and 2-phenyl-2,3-dihydroindole.

3. A diamine of the formula:

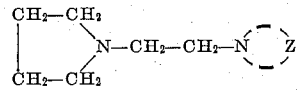

wherein Z is the remainder of a radical selected from the group consisting of indole, 2,3-dihydroindole, 2-phenylindole, and 2-phenyl-2,3-dihydroindole.

4. 1 - [beta-(1-pyrrolidyl)-ethyl]-2,3-dihydroindole.

5. 1 - [beta-(1-pyrrolidyl)-ethyl]-2-phenylindole.

6. 1 - [beta-(1-pyrrolidyl)-ethyl]-2-phenylindole monohydrochloride.

JOHN B. WRIGHT.

No references cited.